US007644394B2

(12) United States Patent
Arnold et al.

(10) Patent No.: US 7,644,394 B2
(45) Date of Patent: Jan. 5, 2010

(54) OBJECT-ORIENTED CREATION BREAKPOINTS

(75) Inventors: Jeremy Alan Arnold, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1961 days.

(21) Appl. No.: 09/997,990

(22) Filed: Nov. 30, 2001

(65) Prior Publication Data

US 2003/0106045 A1 Jun. 5, 2003

(51) Int. Cl.
*G06F 9/44* (2006.01)
*G06F 9/45* (2006.01)
(52) U.S. Cl. .................. 717/128; 717/129; 717/130; 717/158
(58) Field of Classification Search ............... 717/124, 717/125, 127, 129, 130
See application file for complete search history.

(56) References Cited

U.S. PATENT DOCUMENTS

| | | | |
|---|---|---|---|
| 4,796,258 A | | 1/1989 | Boyce et al. |
| 4,866,665 A | | 9/1989 | Haswell-Smith |
| 4,885,717 A | * | 12/1989 | Beck et al. ............ 717/125 |
| 5,093,914 A | | 3/1992 | Coplien et al. |
| 5,124,989 A | | 6/1992 | Padawer et al. |
| 5,321,828 A | * | 6/1994 | Phillips et al. ............ 703/28 |
| 5,560,009 A | * | 9/1996 | Lenkov et al. ............ 717/124 |
| 5,590,330 A | | 12/1996 | Coskun et al. ............ 395/704 |
| 5,630,049 A | | 5/1997 | Cardoza et al. |
| 5,740,440 A | * | 4/1998 | West ............ 717/125 |
| 5,754,839 A | * | 5/1998 | Pardo et al. ............ 712/227 |
| 5,778,230 A | * | 7/1998 | Wimble et al. ............ 717/131 |
| 5,815,653 A | | 9/1998 | You et al. |
| 5,845,125 A | * | 12/1998 | Nishimura et al. ............ 717/129 |
| 5,926,638 A | * | 7/1999 | Inoue ............ 717/125 |

(Continued)

OTHER PUBLICATIONS

"Transformations for model checking distributed Java programs", Stoller et al., May 2001, pp. 192-199. Online retrieved at <http://delivery.acm.org/10.1145/390000/380938/p192-stoller.pdf>.*

(Continued)

*Primary Examiner*—Tuan Q Dam
*Assistant Examiner*—Thuy Dao
(74) *Attorney, Agent, or Firm*—Wood, Herron & Evans, LLP

(57) ABSTRACT

A computer system, program product and method debug an object-oriented computer program by tracking the creation of objects by a plurality of creators (e.g., constructor methods) of a selected class. A user need not separately track each creator. Instead, a debugger identifies each creator and associates breakpoints with all or a user-specified subset of creators to facilitate tracking. Any of the breakpoints may then trigger a halting of execution during debugging. Moreover, in some instances it may be desirable to track the number of creations by all or the subset of the creators for the selected class during program execution until a user-specified condition is satisfied, whereupon program execution is terminated and debugging information is provided to the user.

14 Claims, 5 Drawing Sheets

U.S. PATENT DOCUMENTS

| | | | | |
|---|---|---|---|---|
| 5,940,616 | A | * | 8/1999 | Wang .................. 717/127 |
| 6,044,305 | A | | 3/2000 | Larson et al. |
| 6,077,312 | A | * | 6/2000 | Bates et al. ............ 717/129 |
| 6,091,896 | A | | 7/2000 | Curreri et al. |
| 6,158,045 | A | | 12/2000 | You |
| 6,189,140 | B1 | * | 2/2001 | Madduri ............... 717/128 |
| 6,240,545 | B1 | * | 5/2001 | Carmichael et al. ..... 717/128 |
| 6,240,549 | B1 | * | 5/2001 | Hamada et al. ......... 717/130 |
| 6,266,805 | B1 | * | 7/2001 | Nwana et al. .......... 717/104 |
| 6,266,806 | B1 | * | 7/2001 | Hurd et al. ........... 717/125 |
| 6,378,125 | B1 | | 4/2002 | Bates et al. |
| 6,550,056 | B1 | | 4/2003 | Mizumoto et al. |
| 6,629,123 | B1 | | 9/2003 | Hunt |
| 6,681,384 | B1 | | 1/2004 | Bates et al. |
| 6,718,484 | B1 | | 4/2004 | Kodera |
| 6,823,518 | B1 | | 11/2004 | Bliss et al. |
| 2001/0004766 | A1 | | 6/2001 | Koyama |
| 2003/0079159 | A1 | | 4/2003 | Ten-Hove et al. |

OTHER PUBLICATIONS

"Practicing JUDO: Java under dynamic optimizations", Cierniak et al., Aug. 2000. pp. 13-26. Online retrieved at <http://delivery.acm.org/10.1145/350000/349306/p13-cierniak.pdf>.*

"Breakpoints and breakpoint detection in source-level emulation", Koch et al., Apr. 1998, pp. 209-230. Online retrieved at <http://delivery.acm.org/10.1145/300000/290843/p209-koch.pdf>.*

Montlick, Terry, "What is Object-Oriented Software?", Software Design Consultants, LLC, (1995-1999) downloaded Jul. 9, 2001, http://catalog.com/softinfo/objects.html, pp. 1-7.

"Breakpoint", "Inheritance", "Interface" and "Object-Oriented Programming", FOLDOC downloads from Jul. 9, 2001, http://foldoc.doc.ic.ac.uk/foldoc/foldoc.cgi?, 4 pages.

U.S. Appl. No. 09/998,511, entitled "Inheritance Breakpoints for Use in Debugging Object-Oriented Computer Programs", filed on Nov. 30, 2001 by Arnold et al.

U.S. Patent and Trademark Office, Office Action issued in related U.S. Appl. No. 11/197,895, dated Jan. 13, 2009.

U.S. Patent and Trademark Office, Office Action issued in related U.S. Appl. No. 11/197,895, dated Jun. 24, 2009.

* cited by examiner

```
1  public class MyClass {
2      public MyClass( ) {
3          System.out.println ("Default constructor");
4      }
5      public MyClass (int i) {
6          System.out.println ("One Argument constructor");
7      }
8      public static void main (String args[]) {
9          for (int i=0; i<= 10; i++) {
10             if (i%2 == 0) {
11                 MyClass c = new MyClass();
12             } else {
13                 MyClass c = new MyClass(i);
14             }
15         }
16     }
17 }
```

FIG. 7

OBJECT-ORIENTED CREATION BREAKPOINTS

FIELD OF THE INVENTION

The invention is generally related to computers and computer software. More specifically, the invention is generally related to debugging computer programs, particularly in the field of object-oriented programming (OOP) technology.

BACKGROUND OF THE INVENTION

Debuggers are software tools that can be used to diagnose computer programs and trace errors that arise during execution of the program. Debuggers are commonly used during the development of computer programs, to verify that a program under development operates as intended.

To support a debugger, information describing symbols and types in the program as well as information to map between source (human readable) and executable (machine readable) code is typically required. In the case of compiled programs, a compiler can often produce this information. This extra information, generally referred to as debugging information, enables a programmer to examine the types, variables and data structures used in a program by name and to follow the execution of the program through the source code.

A number of debugging techniques can be used to enable a programmer to properly analyze a program to detect points in the program where errors occur. One such technique is to put a breakpoint into the program, at a point in the program where it is desirable for normal operation to be suspended automatically when certain conditions are met. Breakpoints are useful for program testing. They are specified by programmers so that interim results of processing can be inspected, and then programs can be restarted to continue running normally.

In traditional debuggers, breakpoints are generally set on specific statements within functions or methods; program execution is suspended each time the particular statement is called. In some environments, breakpoints may also be specified to be "conditional" so that execution is suspended by a breakpoint only when a particular condition associated with that breakpoint is met (e.g., after the breakpoint has been hit X times).

Statement-based breakpoints have been found to be very useful for debugging program bugs and inefficiencies in traditional procedural languages that are sequential in nature. However, object-oriented languages, which have found increasing acceptability as programming languages, are based on quite a different concept.

Object-oriented programs are typically created using a set of language tools, abstractions and constructs that support a particular form of user-defined type called a "class". A class functions as a template, and associates a collection of declared data with a set of operations capable of being performed on that data, i.e., methods capable of being called on the data. In an object-oriented program, objects are dynamically created during runtime using the classes as templates. The creation of a new object is often referred to as "instantiation," whereby an object is an "instance" of a class.

A fundamental feature of object-oriented programming is that classes can be related to one another by inheritance. The properties, behaviors, data and operations of a parent, or "base" class may be inherited without modification by some child, or "derived" class, or the behavior, properties and operations may be selectively refined under the control of the programmer in the derived class. The latter function is generally referred to as overriding. When defining a derived class, one may start by building on an existing base class that is similar to the one to be created. The derived class inherits the implementation and behavior of the base class, including its methods and data, except as modified by overriding amendments detailed in the derived class definition. Several classes can inherit the behaviors of a common parent, and in some object-oriented languages a derived class may inherit from more than one base class.

In a working program, objects are instantiated, or created as needed, and built from the templates defined by their respective classes. During runtime, it is often desirable to provide each new object with initial data and/or initiate particular operations with the object. For this reason, many object-oriented environments support special methods known as constructors, or creators, that are called upon an object's creation. One or more constructor methods are typically defined in each class, while a default constructor method may be defined for some classes when no explicit method is defined by the developer.

Many classes support multiple constructor methods that perform different operations based upon how many and what types of data values are provided when creation of an object is desired. Constructor methods typically specify particular call signatures that define the types of data values expected by those methods, so that, when object creation is initiated, the data values supplied therewith can be analyzed to locate a matching constructor method, and the matching constructor method can then be executed.

The use of multiple constructor methods for a class provides significant flexibility for programmers. However, the flexibility in object creation has shortcomings during debugging of the computer program. For example, a programmer may desire to track when objects of a particular class have been created. Conventional breakpoints, which are statement based, could be set on statements in individual constructor methods so that the programmer is notified whenever a statement in a constructor method is hit during creation of an object. However, since more than one constructor may be responsible for creating these objects, a programmer is typically required to manually set a breakpoint on a statement in each constructor method for a class. Manually setting a breakpoint on a statement in each constructor method, however, can be excessively burdensome and time consuming, and a distinct risk exists that a programmer may inadvertently forget to set a breakpoint in one of the constructor methods, or forget to remove all of the breakpoints once the condition has been adequately tested.

In addition, in some situations a programmer may wish to track the number of objects that are created for a particular class. As an example, a programmer may wish to verify that an excessive number of objects are not created for a particular purpose, e.g., in a database environment, where a programmer might intend for no more than 10 database connections to be active at any given time. Through the use of manually-set breakpoints in all constructor methods, a programmer could manually count the number of object creations; however, doing so could be unduly burdensome when tens, hundreds or thousands of objects are normally created in a program.

Should halting execution after each object creation be unduly burdensome, a programmer could utilize conditional breakpoints in each constructor method to trigger only after a certain number of hits. However, given that each breakpoint would independently track the number of times it was hit, and given that a programmer may not know the relative frequency that each constructor method for a particular object is called, the programmer would still not be able to be notified after a specific number of objects were created.

Consequently, a significant need exists for a method of debugging an object-oriented computer program that facilitates the tracking of object creation operations during execution of the computer program.

SUMMARY OF THE INVENTION

The invention addresses these and other problems associated with the prior art by providing an apparatus, program product, and method of debugging an object-oriented computer program that facilitate the tracking of object creation operations by multiple creators for a particular class defined in a computer program.

Consistent with one aspect of the invention, for example, an object-oriented computer program is debugged using a plurality of breakpoints set for a plurality of creators for a class defined in the object-oriented computer program. Specifically, in response to user input, a plurality of creators for the class are identified, and a plurality of breakpoints are set on the identified creators. Execution of the object-oriented computer program is then halted during debugging in response to hitting any of the plurality of breakpoints.

In some embodiments, the plurality of breakpoints are associated with a "creation" breakpoint, whereby user input received from a programmer or other user is directed toward performing operations on the creation breakpoint, rather than the breakpoints set on the various creators. Functionality within the debugger thus manages the plurality of breakpoints as a collective group. Irrespective of whether the plurality of breakpoints are associated with a common creation breakpoint, however, through the automated identification of creators for a class in response to user input, a programmer or other user is relieved of the burden of manually identifying creators and setting individual breakpoints on the different creators for a particular class.

Consistent with another aspect of the invention, an object-oriented computer program is debugged by tracking a number of object creations of a class defined in the object-oriented computer program during debugging, and halting execution of the object-oriented computer program in response to the number of object creations meeting a condition. As such, object creations are tracked across multiple creators.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 7 is an illustrative example of an object-oriented computer program having a class defining multiple creators.

DETAILED DESCRIPTION

The embodiments illustrated hereinafter facilitate the debugging of object-oriented computer programs by tracking the execution of a multiple creators for classes defined in such computer programs. Typically, such tracking occurs through the use of "creation" breakpoints that permit tracking of multiple creators to be managed in a collective manner. Creators are typically implemented via constructor methods in many object-oriented programming environments, although it is envisioned that other environments may utilize default or other creators that are not explicitly defined by a programmer, but rather are implicitly defined. In still other environments, no methods may be called in response to creation of an object. Nonetheless, it may be beneficial to define this default condition, in which no method as called, to be analogous to one "creator" for the class.

Creation breakpoints typically have associated therewith multiple breakpoints that are set on the various creators for a particular class, and typically on specific statements within such creators. Moreover, the multiple breakpoints are typically managed in a collective manner through user interaction with a creation breakpoint, e.g., so that the breakpoints can be collectively set or removed in response to particular user input, rather than being managed individually through user interaction with each breakpoint. While some environments may support interaction with individual breakpoints associated with a creation breakpoint, in the embodiments discussed hereinafter, the individual breakpoints are essentially hidden from the user (e.g., a programmer, developer, program tester, etc.) such that only interaction with the creation breakpoint itself is principally supported.

In other embodiments, the multiple breakpoints used to track the multiple creators are not associated with a common creation breakpoint. In such embodiments, however, the automated functionality described herein typically facilitates the setting of the multiple breakpoints by virtue of the automated nature in which creators can be identified (and optionally presented to a user for selection), and breakpoints may be collectively set.

Moreover, as will be discussed in greater detail below, the embodiments described herein also facilitate tracking of object creations via multiple creators, typically via maintaining a common counter that is incremented in response to hitting any of the breakpoints set on the multiple creators. The counter, as well as a condition that triggers a halting of execution based upon the state of the counter, are typically maintained in association with a creation breakpoint. However, it will be appreciated that, in other embodiments, object creation tracking across multiple creators may not require the utilization of a creation breakpoint and/or the utilization of breakpoints that are set on individual creators for a class.

Figure 1:
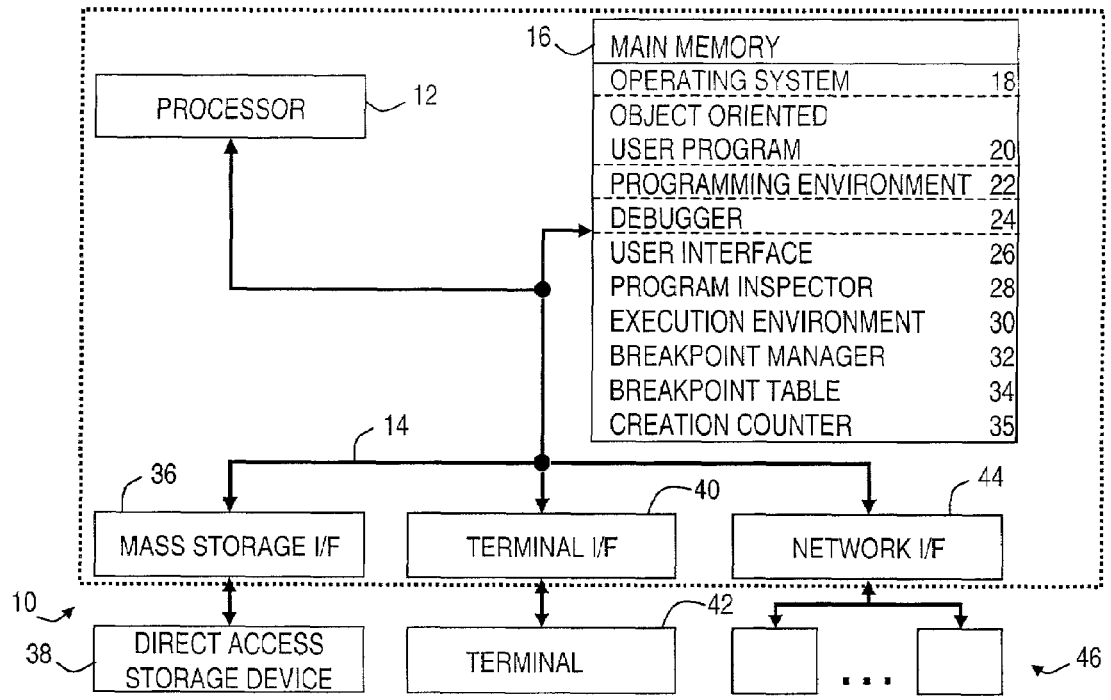
FIG. 1 is a block diagram of a computer system incorporating a debugger supporting object-oriented creation breakpoints consistent with the invention.

Turning now to the Drawings, wherein like numbers denote like parts throughout the several views, FIG. 1 illustrates a computer system 10 suitable for utilizing creation breakpoints consistent with the invention. Computer system 10 is shown for a multi-user programming environment that includes at least one processor 12 that obtains instructions or op codes, and data via a system bus 14 from a main memory 16. Computer system 10 may be implemented as a PC-based server, a minicomputer, a midrange computer, a mainframe computer, etc. In other embodiments, however, computer system 10 may be implemented using practically any other type of computer or programmable electronic device, including single-user computers such as desktop computers, laptop computers, handheld computers, etc.

Processor 12 may represent one or more processors (e.g., microprocessors), and memory 16 may represent the random access memory (RAM) devices comprising the main storage of computer system 10, as well as any supplemental levels of memory, e.g., cache memories, non-volatile or backup memories (e.g., programmable or flash memories), read-only memories, etc. In addition, memory 16 may be considered to include memory storage physically located elsewhere in computer system 10, e.g., any cache memory in a processor 12, as well as any storage capacity used as a virtual memory, e.g., as stored on a direct access storage device 38 or on another computer coupled to computer system 10 via a network 46. Furthermore, practically any interconnect architecture, or collection of interconnect architectures, may be used to implement system bus 14 consistent with the invention.

Memory 16 is shown having resident therein an operating system 18, an object-oriented user program 20, and a programming environment 22 (e.g., an Integrated Development Environment (IDE)). The programming environment 22 typically provides tools for creating, editing, compiling and debugging the user program 20.

As such, among the tools supported by programming environment 22 is a debugger 24 that monitors and interfaces with program execution to diagnose the user program 20. The debugger 24 includes a user interface 26, a program inspector 28, an execution environment 30, a breakpoint manager 32, a breakpoint table 34, and a creation counter 35, the use and configuration of each of which is described in greater detail below.

In the illustrated embodiment, the debugger 24 is illustrated as being resident on the same platform upon which the user program 20 runs. In other embodiments, however, a debugger may be resident on a different platform than a programming and/or execution environment, e.g., when debugging embedded systems, or debugging server-based programs, on a programmer's workstation.

FIG. 1 also illustrates that computer system 10 also may include various interfaces for coupling the computer system to various external devices. For example, a mass storage interface 36 interfaces computer system 10 to one or more mass storage devices 38, e.g., a direct access storage device (DASD). In addition, a terminal interface 40 interfaces computer system 10 to one or more terminals or workstations 42, and a network interface 44 interfaces computer system 10 to one or more networks 46. Any number of alternate computer architectures, incorporating other collections of external devices, may be used in the alternative.

The discussion hereinafter will focus on the specific routines utilized to implement the herein-described debugger functionality. In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Figure 2:
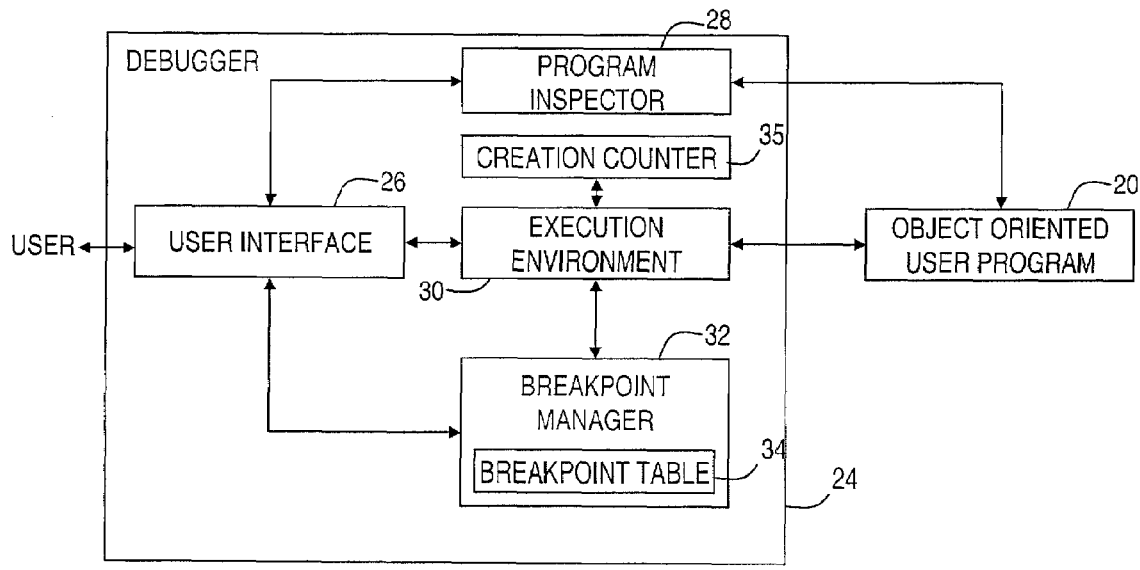
FIG. 2 is a block diagram of the principal software components in the debugger of FIG. 1.

The principal components in debugger 24 are illustrated in FIG. 2, showing the relationship between each of these components and user program 20. User interface 26 provides the mechanism through which user input may be received from a user, as well as the mechanism through which information such as debugging information can be presented to the user. Program inspector 28 is used to derive important information about a program, e.g., what are the constructors or creators for a particular class of object.

Execution environment 30, which in the illustrated implementation is considered part of debugger 24, provides the underlying platform through which user program 20 is executed in the debugger. In other applications, the execution environment may be implemented in a separate application that is interfaced with the debugger.

Breakpoint manager 32 provides breakpoint management functionality for debugger 24, and it is within this module that much of the creation breakpoint functionality is implemented in the illustrated embodiment. It will be appreciated that a wide variety of other debugging tools may also be incorporated into debugger 24, including, for example, support for watches (allowing a user to see the current value for a particular variable), code stepping (allowing the user to execute a single line or instruction at a time), etc. These additional functions have been omitted from FIG. 2, however, as they are not particularly relevant to an understanding of the use of creation breakpoints consistent with the invention.

In the illustrated embodiment, breakpoint manager 32 supports conventional statement-based breakpoints, as well as creation breakpoints consistent with the invention. Moreover, any type of breakpoint may be associated with a condition, as is well known in the art. Included within the breakpoint manager is typically functionality for setting breakpoints, removing breakpoints, and processing breakpoints when they are hit while the object-oriented program is executed in the execution environment. Creation breakpoints consistent with the invention may be implemented more or less as extensions to conventional breakpoints in the illustrated embodiment.

However, in other embodiments, creation breakpoints may be handled completely separately from conventional breakpoints.

As is also shown in FIG. 2, one or more creation counters 35 may be accessible by the execution environment to log or track the number of creations of various types of objects. As will be discussed in greater detail below, as an alternative to utilizing separate creation counters, the creation counters may be stored within breakpoint table 34 and associated with the particular creation breakpoints defined therein.

Figure 3:
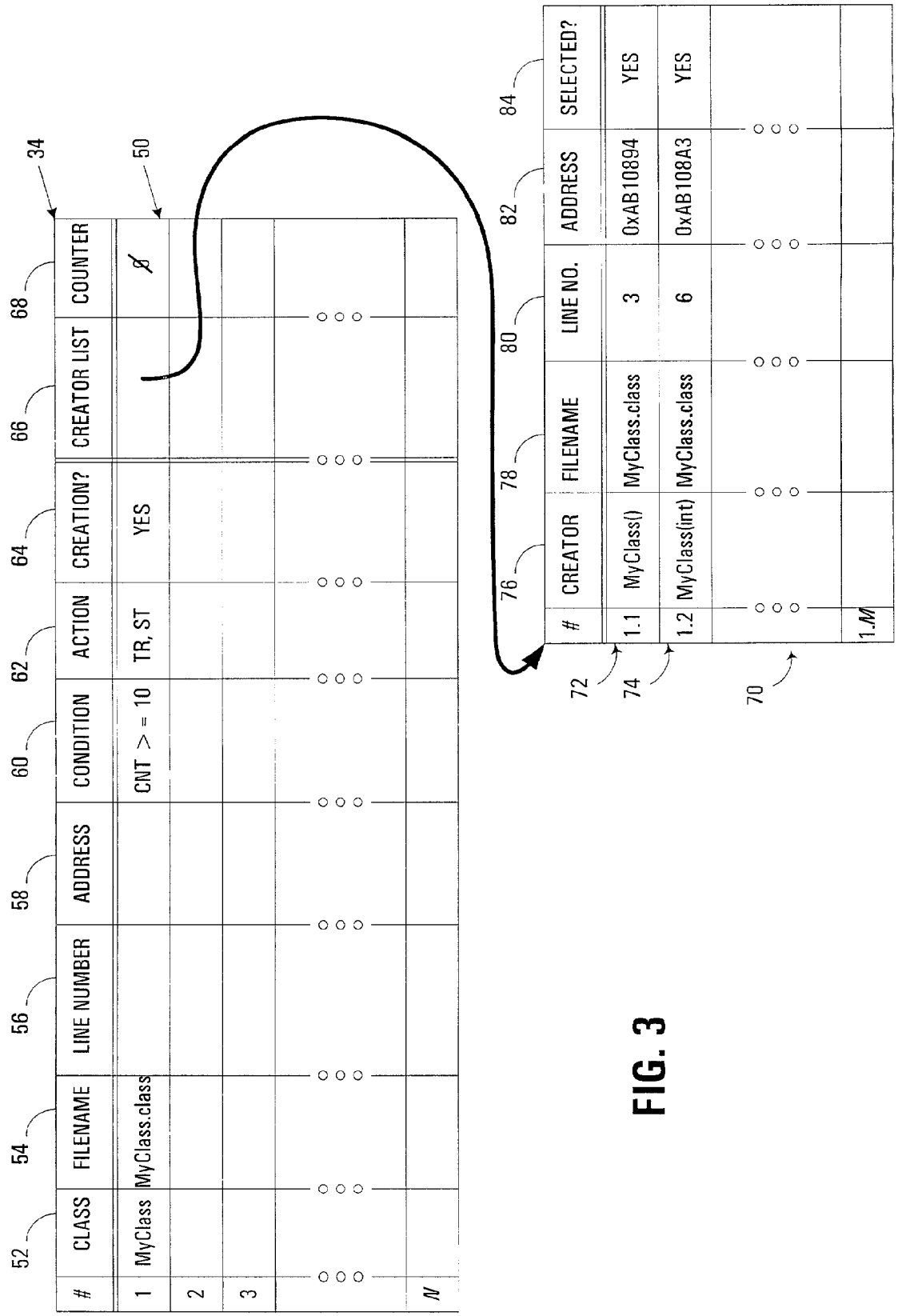
FIG. 3 is an exemplary data structure implementation for the breakpoint table of FIG. 2.

Now turning to FIG. 3, an exemplary implementation of breakpoint table 34 is illustrated in greater detail. Breakpoint table 34 includes a plurality of entries 50, each including a plurality of fields 52-68. In the illustrated implementation, breakpoint table 34 defines both conventional-type breakpoints, as well as creation breakpoints consistent with the invention.

Fields 52, 54, 56 and 58 respectively store the class, file name, source code line number, and executable code address that identify a specific breakpoint, and that provide a mapping between the location of the breakpoint in the source code and in the executable code, e.g., so the appropriate source code may be displayed in response to hitting the breakpoint during execution of the executable code. It should be appreciated that other combinations of identifiers may be utilized to identify the position of each breakpoint in the source and/or executable code.

Field 60 stores an optional condition to be associated with a breakpoint, and field 62 stores one or more actions to be performed in response to hitting the breakpoint, e.g., initiating a trace operation, halting execution, displaying debug information, logging debug information to a file or socket, etc. Various additional types of conditions and resulting actions are well understood in the art.

Field 64 identifies whether the breakpoint is a creation breakpoint. If not set, it is assumed that the breakpoint for a given entry is a conventional-type breakpoint. Otherwise, if field 64 is set to indicate a creation breakpoint, the entry is treated as a creation breakpoint, and additional fields 66, 68 are utilized in association therewith.

In particular, field 66 provides a pointer to a creator list 70, which includes a plurality of entries 72, 74 that are associated with specific creators for a particular class. Each entry 72, 74 includes a creator field 76 that identifies the creator associated with the entry. Each entry also includes fields 78, 80 and 82, which respectively store the file name, source code line number, and executable code address of a statement in the creator upon which a breakpoint is set for that creator. Field 84 stores whether the particular creator is selected by the user, i.e., whether the creator is being actively monitored for breakpoint hits. In the alternative, field 84 may be omitted, with the assumption being that each entry listed in list 70 is an active creator. In the configuration shown in FIG. 3, however, creators that exist for a particular class, but which are not monitored for hits thereto, are still listed, but are essentially ignored during execution.

In addition, as shown in FIG. 3, each entry 50 in the breakpoint table 34 may also include an optional counter field 68, which is used to store a creation counter for a creation breakpoint. Maintenance of a counter in breakpoint table 34 is an alternative implementation to the use of a separate creation counter 35 as shown in FIG. 2. Either implementation may be used in various embodiments consistent with the invention.

As may be appreciated from FIG. 3, creation breakpoint table 34 presumes that all of the creators for a particular class are defined in that class. In other embodiments, however, creators that have not been overridden from any super classes of a particular class may also be incorporated into the creator list for a particular creation breakpoint. In such an instance, it may be desirable to include a class field in each entry 72, 74 of creator list 70.

It will be appreciated that a wide variety of alternate data structures may be utilized to store the breakpoint information utilized in connection with creation breakpoints consistent with the invention. Therefore, the invention is not limited to the particular data structures described herein.

Figure 4:
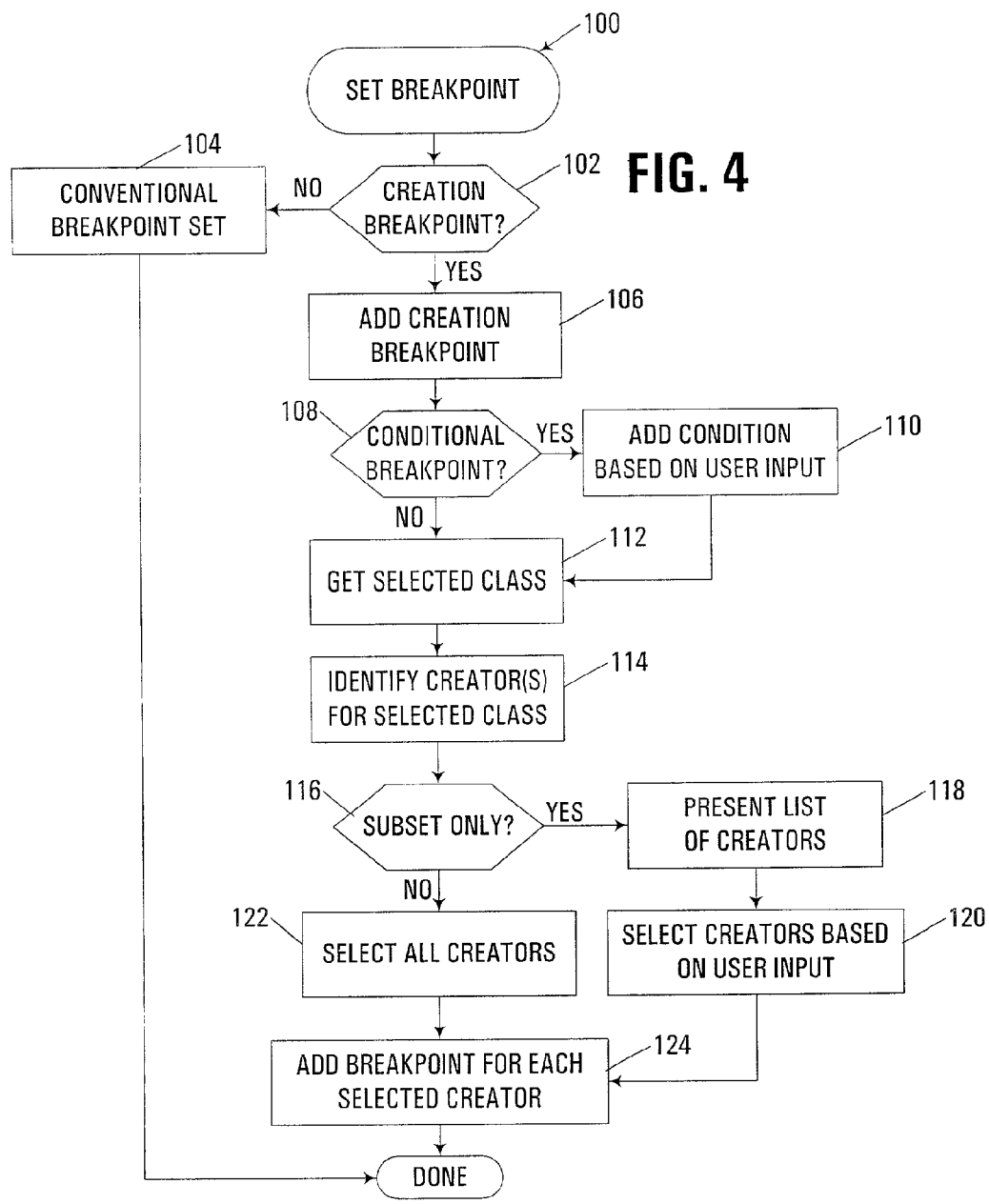
FIG. 4 is a flow diagram for a set breakpoint routine executed by the debugger of FIG. 2.

To implement creation breakpoints consistent with the invention, a number of routines are supported by breakpoint manager 32 of FIG. 2. FIG. 4, for example, illustrates a set breakpoint routine 100, which is utilized to set a breakpoint in the debugger 24 via interaction by a user through user interface 26 (FIG. 2). Routine 100 may be initiated via any number of user input operations, e.g., via a graphical user interface control such as a button, menu, pop-up menu, etc., or via a command line command, a keystroke combination, or other user input operation known in the art.

Routine 100 begins in block 102 by determining whether the user has indicated a desire to set a creation breakpoint. If not, control passes to block 104, where a conventional breakpoint is set in a manner known in the art. Otherwise, block 102 passes control to block 106 to add the creation breakpoint, by adding an entry to breakpoint table 34 for the creation breakpoint. Next, block 108 determines whether the creation breakpoint is a conditional breakpoint. If so, control passes to block 110 to add a condition based upon user input, e.g., by storing the condition in the entry for the creation breakpoint in breakpoint table 34.

Any type of condition commonly utilized in connection with breakpoints may be utilized as a condition for a creation breakpoint consistent with the invention. Moreover, a creation breakpoint may also incorporate a counter condition whereby the total number of hits to a particular class of object may be tracked across multiple creators. As such, by specifying a particular number of creations and/or an operator, a user may specify that a creation breakpoint be triggered only upon meeting a particular condition. As an example, one possible condition would be that the total number of object creations meets or exceeds a predetermined threshold.

If a conditional breakpoint is not specified, or after a specified condition has been added to the creation breakpoint entry, control passes to block 112 to obtain the selected class with which to associate the creation breakpoint. Next, in block 114, the creators for the selected class are identified, e.g., by utilizing program inspector 28 of debugger 24 to obtain the list of creators (optionally including those in a super class) for the selected class.

For example, in a Java programming environment, program inspector 28 may use Java reflection API's, the use and configuration of which are known in the art. In other embodiments, other mechanisms may be used to determine what creators exist for a particular class. In addition, inheritance concepts may be utilized in connection with the creation breakpoints described herein, e.g., as described in U.S. patent application Ser. No. 09/998,511, filed on even date herewith by Jeremy Alan Arnold et al., entitled "INHERITANCE BREAKPOINTS FOR USE N DEBUGGING OBJECT-ORIENTED COMPUTER PROGRAMS," which application is incorporated by reference herein.

Next, block 116 determines whether the user has specified that only a subset of the creators are to be associated with the creation breakpoint. If so, control passes to block 118 to present a list of creators to the user for selection thereby. Block 120 then selects the creators based upon the selections made by the user. Returning to block 116, if the user has not specified to only associate a subset of creators with a creation breakpoint, control passes directly to block 122 to select all creators for inclusion with the creation breakpoint.

Once the creators have been selected in block 120 or 122, control passes to block 124 to add a breakpoint for each selected creator, whereby routine 100 is then complete.

To implement block 124, conventional-type breakpoints are typically added at specific locations in each creator. However, unlike conventional breakpoints, the breakpoints set on each creator are stored in a creator list 70, rather than as separate entries in breakpoint table 34. As far as interaction with an object-oriented user program, however, typically the addition of a breakpoint for each selected creator occurs in much the same manner, whereby either a branch instruction to debugger program code, or alternatively an invalid instruction that triggers an exception, is typically inserted into the user program at the specified location. Other manners of modifying a user program to incorporate breakpoints on a temporary basis may also be used in the alternative.

In the illustrated implementation, the individual breakpoints associated with a creation breakpoint are typically set on a particular statement in each creator, e.g., the first statement. Other statement-based breakpoints, as well as non-statement-based breakpoints that are associated with the creators themselves, may be used in the alternative.

Moreover, it should be appreciated that the population of data in breakpoint table 34 may occur in a number of manners consistent with the invention. For example, entries for each creator may be added to creator list 70 in block 114 of FIG. 4, with the selected field 84 for each entry modified in blocks 122 and 120 as appropriate. In addition, fields 78-82 may only be modified in block 124 for those selected creators. In the alternative, each creator may have a breakpoint set thereon even if the creator is not selected, with functionality in the debugger utilized to ignore the breakpoint if it is determined that the creator with which it is associated is not selected.

Moreover, the manner in which a user may supply the user input for each of the operations illustrated in FIG. 4 may vary in different embodiments. For example, a user may be presented with a dialog box upon requesting that a creation breakpoint be created for a particular class (e.g., by right-clicking on a class definition and selecting appropriate menu entry on the pop-up menu that is displayed as a result thereof). The dialog box may include, for example, fields for entering a condition, selecting or unselecting particular creators, etc. As such, it should be appreciated that the operations performed in routine 100 may occur in different orders, e.g., a user may be presented with a list of creators initially upon requesting to create a creation breakpoint, and may be presented with the opportunity to specify a condition and select all or a subset of the creators in the same dialog box, with selection of a "OK" button resulting in the generation of the appropriate breakpoint data. Other modifications and alternatives will be apparent to one of ordinary skill in the art.

Figure 5:
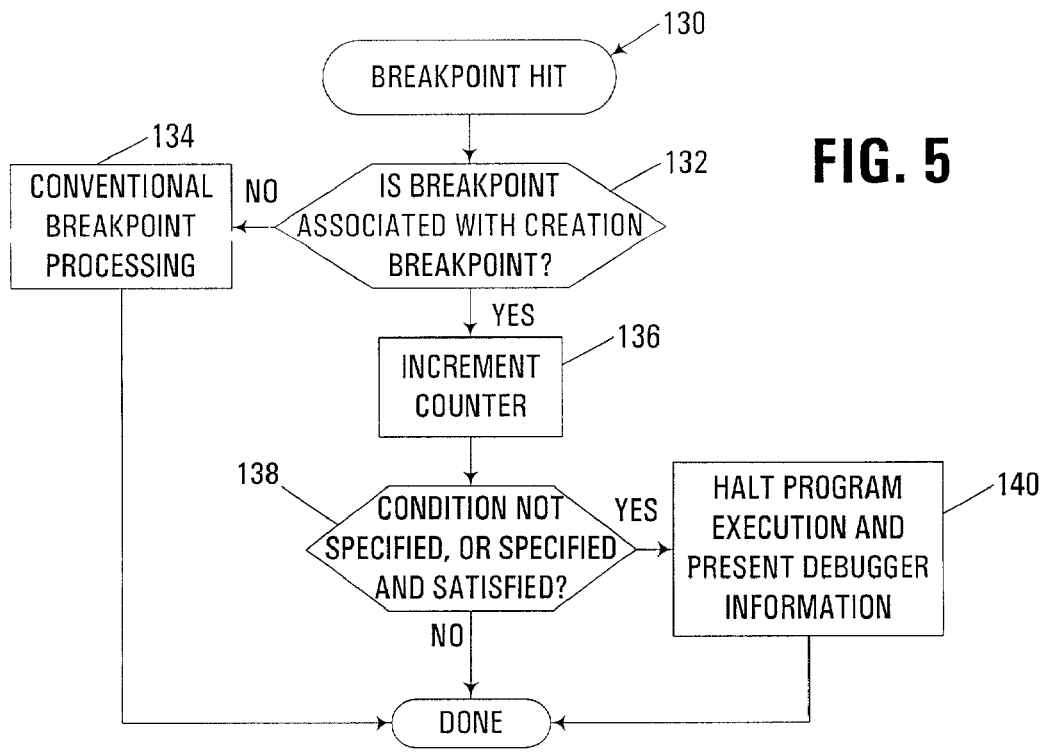
FIG. 5 is a breakpoint hit routine executed by the debugger of FIG. 2.

Once individual breakpoints are set for a particular creation breakpoint, processing of breakpoints during debugging of a computer program proceeds in a similar manner to that for conventional breakpoints. FIG. 5, for example, illustrates a breakpoint hit routine 130 that is executed whenever a breakpoint is hit during execution of a computer program being debugged. Routine 130 begins in block 132 by determining whether the breakpoint is associated with a creation breakpoint. This step may be performed, for example, by determining whether the breakpoint is in a creation list 70, or alternatively, supplied as a non-creation entry 50 in breakpoint table 34 (i.e., an entry 50 where the creation flag in field 64 is not set).

If the breakpoint is not a creation breakpoint, block 132 passes control to block 134 to handle the breakpoint in a conventional manner. Otherwise, block 132 passes control to block 136 to increment the counter associated with the creation breakpoint.

Next, block 138 processes any conditions associated with the creation breakpoint. If no condition is specified, or if a condition is specified but has not yet been satisfied, block 138 terminates without triggering the breakpoint. If no condition is specified (indicating that the creation breakpoint is unconditional), or if the condition specified for the breakpoint has been satisfied, control passes to block 140 to halt program execution and present debugger information associated with the creation breakpoint, in a manner similar to conventional breakpoints. Any additional actions associated with the creation breakpoint may also be performed at this time.

Figure 6:
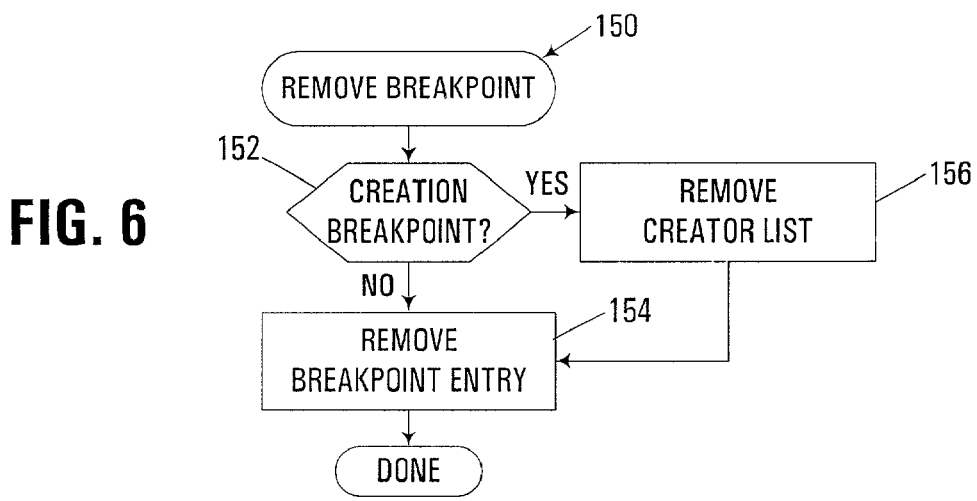
FIG. 6 is a remove breakpoint routine executed by the debugger of FIG. 2.

Yet another operation that may be performed in connection with a creation breakpoint is the removal of the creation breakpoint once a user is satisfied that no further debugging with the creation breakpoint is required. FIG. 6 illustrates a remove breakpoint routine 150 that handles the removal of a creation breakpoint in a similar manner to a conventional breakpoint, with the exception that additional steps are performed to clear the creator list for the creation breakpoint entry.

In particular, routine 150 begins in block 152 by determining whether the breakpoint to be removed is a creation breakpoint. If not, the breakpoint entry therefor is removed from breakpoint table 34 in a conventional manner, as shown in block 154. If, however, the breakpoint is a creation breakpoint, prior to removing the breakpoint entry, the creator list 70 is removed as well, as shown in block 156.

Therefore, it will be appreciated that, through the utilization of a creation breakpoint entity, multiple breakpoints associated with multiple creators can be managed collectively, i.e., set and/or removed as a group. Thus, a user is often freed from the burden of setting or removing individual breakpoints to or from particular creators. Moreover, as illustrated above in connection with FIG. 5, a counter can be incremented for each creation of an object of a particular class, regardless of the creator being used to create that object.

As an example of the operation of debugger 24, FIG. 7 illustrates in a window 180 a portion of a computer program 190 including a class definition 192. As shown in FIG. 7, class 192 includes two constructor methods, or creators, defined at lines 2-4 and 5-7, respectively. For the purposes of illustration, class 192 is illustrated as a Java-compatible program. The creator defined at lines 2-4 is a default constructor method having a call signature of "MyClass( )", and the creator defined at lines 5-7 is another constructor method having a call signature of "MyClass(int)", which differs from the default constructor method in that it accepts a single integer argument i.

In the exemplary program 190, the main( )method defined in the program creates eleven "MyClass" objects, with six of those objects created using the default constructor method "MyClass( )", and five of the objects created using the alternate constructor method "MyClass(int)". Suppose, however, that the programmer that developed the main( ) method intended that the main loop execute ten times, rather than the eleven times. For example, suppose the programmer intended the terminating condition for the FOR loop to be "i<10" rather than "i<=10" as is shown in FIG. 7.

Creation breakpoints consistent with the invention may be utilized in a number of manners to catch this programming error. For example, an unconditional creation breakpoint could be set on the MyClass( ) class, and with "all creators"

specified such that individual breakpoints will be set on each constructor method. During execution while under debug, the creation breakpoint would be triggered eleven times, once for each creation of a "MyClass( )" instance. Were the programmer to manually count the number of times the creation breakpoint is hit, the programmer would be able to determine that the breakpoint was hit eleven times, rather than the intended ten times, and take appropriate corrective action thereafter.

In the alternative, the programmer could set a conditional creation breakpoint on the "MyClass" class, specifying that all creators be tracked, and specifying a condition that triggers the breakpoint if the number of "MyClass" instances is greater than or equal to ten.

FIG. 3, for example, illustrates the resulting entry 50 that might be created in response to a user request to set the aforementioned conditional creation breakpoint on the "MyClass" class. In this instance, the class and file name fields 52, 54 for the entry specify the class and file name within which the class is defined. As entry 50 defines a creation breakpoint, however, typically fields 56 and 58 are not used, and would thus are left blank. Also, since a user has specified a condition, that condition is stored in field 60 as shown in FIG. 3, and any desired actions are indicated in field 62. Field 64 specifies that the breakpoint is a creation breakpoint, and creator list field 66 points to the creator list 70 shown in FIG. 3. Field 68 is initially set at an initial null value prior to execution of the program under debug.

Within creator list 70 are entries 72, 74, each associated with a particular creator defined in the class. Entry 72 is associated with the default constructor method "MyClass( )", which is identified in field 76 for the entry. Field 78 stores the file name for the creator, and fields 80 and 82 respectively store the source code line number and executable code address of the precise statement with which the breakpoint for that entry is associated. Similar information for the "MyClass (int)" constructor method is stored in entry 74. Field 84 for each entry 72, 74 also indicates that the creator is selected, as in this example it is presumed that the programmer has requested to track all creators.

Under this scenario, during execution under debug, the creation breakpoint would be reached two times, upon the tenth and eleventh creations of a "MyClass" object. Thus, if a programmer discovered that he or she was creating more "MyClass" objects than expected, the programmer could use conventional debugging techniques to step through the code after the tenth creation to find out why an eleventh creation was occurring, and correct the error as appropriate.

Various modifications may be made to the illustrated embodiments without departing from the spirit and scope of the invention. For example, the breakpoints with which a creation breakpoint is associated may be set on creators as a whole, rather than on specific statements in those creators. Also, creation breakpoints may be handled completely separately from conventional-type breakpoints, and may not rely upon conventional-type breakpoints within each creator of a particular class.

Other modifications will be apparent to one of ordinary skill in the art having the benefit of the instant disclosure. Therefore, the invention lies in the claims hereinafter appended.

What is claimed is:

1. A computer-implemented method of debugging an object-oriented computer program, the method comprising:
    (a) tracking a number of object creations of a class defined in the object-oriented computer program during debugging, wherein the tracked number of object creations includes object creations resulting from multiple creators for the class; and
    (b) halting execution of the object-oriented computer program in response to the number of object creations meeting a condition.

2. The method of claim 1, wherein the condition is the number of object creations meeting or exceeding a threshold.

3. The method of claim 1, wherein tracking the number of object creations includes incrementing a counter in response to hitting any of a plurality of breakpoints set on a plurality of creators for the class.

4. The method of claim 1, further comprising, in response to user input, identifying the plurality of creators for the class and setting the plurality of breakpoints on the identified creators.

5. The method of claim 4, wherein identifying the plurality of creators includes identifying every creator for the class.

6. The method of claim 5, wherein each creator comprises a constructor method defined in the class.

7. The method of claim 4, further comprising, after identifying the plurality of creators, displaying a list of the identified creators and receiving user input to select a subset of identified creators, wherein the plurality of breakpoints are set on only the subset of the identified creators.

8. The method of claim 4, wherein the plurality of breakpoints are collectively set on all of the identified creators in response to the user input.

9. The method of claim 4, wherein identifying the plurality of creators and setting the plurality of breakpoints are performed in response to user input to set a creation breakpoint, and wherein the plurality of breakpoints are associated with the creation breakpoint.

10. An apparatus, comprising:
    (a) a memory within which resides at least a portion of an object-oriented computer program; and
    (b) program code configured to debug the object-oriented computer program by tracking a number of object creations of a class defined in the object-oriented computer program during debugging, and halting execution of the object-oriented computer program in response to the number of object creations meeting a condition, wherein the tracked number of object creations includes object creations resulting from multiple creators for the class.

11. The apparatus of claim 10, wherein the condition is the number of object creations meeting or exceeding a threshold.

12. The apparatus of claim 10, wherein the program code is configured to track the number of object creations by incrementing a counter in response to hitting any of a plurality of breakpoints set on a plurality of creators for the class, and wherein the program code is further configured to, in response to user input identify the plurality of creators for the class and set the plurality of breakpoints on the identified creators.

13. The apparatus of claim 12, wherein the program code is configured to identify the plurality of creators and set the plurality of breakpoints in response to user input to set a creation breakpoint, and wherein the plurality of breakpoints are associated with the creation breakpoint.

14. A program product, comprising:
    (a) program code configured to debug an object-oriented computer program by tracking a number of object creations of a class defined in the object-oriented computer program during debugging, and halting execution of the object-oriented computer program in response to the number of object creations meeting a condition, wherein the tracked number of object creations includes object creations resulting from multiple creators for the class; and
    (b) a recordable medium storing the program code.

* * * * *

UNITED STATES PATENT AND TRADEMARK OFFICE
CERTIFICATE OF CORRECTION

PATENT NO.       : 7,644,394 B2  
APPLICATION NO.  : 09/997990  
DATED            : January 5, 2010  
INVENTOR(S)      : Arnold et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2266 days.

Signed and Sealed this

Sixteenth Day of November, 2010

David J. Kappos  
*Director of the United States Patent and Trademark Office*